Patented Mar. 28, 1944

2,345,138

UNITED STATES PATENT OFFICE 2,345,138

PROCESS FOR CONDENSATION OF PRIMARY ALIPHATIC ALDEHYDES

Hans Machemer, Burghausen, Germany; vested in the Alien Property Custodian

No Drawing. Application May 18, 1940, Serial No. 336,013. In Germany May 27, 1939

12 Claims. (Cl. 260—494)

The invention refers to the production of glycols and esters thereof by condensation of aliphatic primary aldehydes having 3 to 6 carbon atoms.

I have found that carbides of the alkaline earth metals, either alone or in combination or admixture with oxides of the alkaline earth metals such as the hydroxides, are excellently suitable as condensation agents for the above purpose. This fact is surprising, because milk of lime is known to have little use as condensation agent for the substituted aldehydes. During the reaction, according to my invention, indifferent solvents can be present, but it is not always necessary to use them. Also it is possible to perform the process at either elevated or reduced pressure. It is not always necessary to use pure aldehydes for starting materials. Other suitable initial substances are those such as often occur in the industry, which contain water and/or acids or compounds reacting like aldehydes.

When operating with aldehyde mixtures, corresponding mixtures of glycol half esters and glycols are obtained. The half esters, being formed during the reaction cannot always be isolated, because they are occasionally saponified by the alkaline reacting condensation agent being present and especially—when water is present—in the reaction mixture so that 1,3-glycol and aliphatic carbon acids are obtained as the end product. The reaction is usually performed at boiling temperature under reflux but it can also be carried out at lower temperatures, although this requires more time.

In practice the process is preferably performed in such a way that the mixture of the starting materials is stirred with the condensation agent while heating in a stirring apparatus—suitably supplied with a reflux condenser—until the condensation is completed. It is also possible to conduct or pump the starting materials continually over the condensation agent, for example granulated calcium carbide, whereby an equal generation of acetylene results. The working up of the reaction mixture usually is executed in vacuum, after having siphoned off the condensate and having separated the oil, retained in the carbide sludge by extraction or solution of the lime sludge in cold diluted acid. The 1,3-glycol half esters obtained according to the invention are used especially as softening agents and solvents in the lacquer industry.

Example 1

100 parts by weight of anhydrous butyric aldehyde are boiled under reflux and stirring with 20 parts of calcium carbide for four hours and a half, whereby the temperature of reaction vessel increases to 140° C. Thereby nearly 1 part of acetylene is formed. When the reaction product is worked up, there are obtained:

5 parts of a fraction containing 2-ethyl-3n-propyl-acrolein, 12 parts of 2-ethyl-n-hexandiol-(1.3), 63 parts of 2-ethyl-n-hexandiol-(1.3)-butyrate boiling at 143° C. at 1 mm. ($D_{20}$=0.943) and 7 parts in residue.

Example 2

A mixture of 100 parts of butyric aldehyde, 2.7 parts of water and 1.7 parts of crotonic aldehyde is brought in contact—by repumping—with 9 parts of calcium carbide which contains 1 part of calcium oxide. Thereupon the temperature is increased from 50° to 130° C. During the condensation 3 parts of acetylene are generated. After having finished the reaction—that is when no more butyric aldehyde is present, the mixture is cooled down, acidified with hydrochloric acid and then fractionated under vacuum. There are obtained:

19 parts of 2-ethyl-3-propyl-acrolein, 5 parts of 2-ethyl-hexandiol-(1.3) and 37 parts of 2-ethylhexandiol-(1.3)-butyrate.

Example 3

100 parts of butyric aldehyde containing 0.5% of water are boiled with a mixture of 5 parts of calcium carbide and 0.05 parts of barium oxide for 5 hours under reflux, whereupon the temperature increases to 120° C. During the fractionation under vacuum 15 parts of 2-ethyl-3-propyl-acrolein pass over. The contents of the reaction vessel are saponified with sodium lye, whereupon 41 parts of 2-ethylhexandiol-(1.3) boiling at 132° C. at 11 mm. ($n^{20}/D$=1.453, $D_{20}$=0.935) and 22 parts of butyric acid are obtained.

Example 4

100 parts of technical capronic aldehyde, which contains small quantities of caproic acid and about 0.6% of water are heated with 20 parts of calcium carbide for four hours at about 110° C., whereupon 3 parts of acetylene gas are generated. After precipitation the mixture is filtered and the turbid solution containing calcium oxide is fractionated under vacuum. There are obtained, boiling at 121° C. at 6 mm., 40 parts of 2n-butyl-3-n-amyl-acrolein and 2n-butyl-3n-amyl-propyl-alcohol and the caproic acid ester thereof; boiling at 135-153° C. at 1 mm., 10 parts of 2-n- butyl-3n-amyl-propandiol-1.3-capronate besides 35 parts of residue.

Example 5

100 parts of isopropyl-acetaldehyde are condensed at boiling temperature under reflux for about 3 hours in the presence of calcium carbide. There are obtained 29 parts of half ester boiling at 130–170° C. at 16 mm., which yields 2-isopropyl-3-isobutyl-propandiol-(1.3) boiling at 130° C. at 12 mm., if saponified.

Example 6

100 parts of butyric aldehyde, containing 0.5% of water are heated with 50 parts of xylene and 15 parts of calcium carbide under stirring for 8 hours at about 110° C. Thereupon 4 parts of acetylene are generated. When the oil, decanted from the sludge of carbide, is fractionated, there are obtained:

5 parts of butyric aldehyde, 14 parts of 2-ethyl-3-propyl-acrolein and 38 parts of 2-ethyl-n-hexandiol-1.3-butyrate.

Example 7

100 parts of propionic aldehyde are boiled with 5 parts of calcium carbide for 6 hours under reflux. Then the mixture is distilled whereupon 12 parts of methyl-ethyl-acrolein pass over. The residue consists in the main of 2-methyl-pentandiol-1,3-propionate boiling at 120–125° C. at 15 mm. The ester is saponified with an excess of sodium lye, whereby 34 parts of 2-methyl pentandiol-1,3 boiling at 100–105° C. at 15 mm. and 18 parts of propionic acid are obtained.

The invention claimed is:

1. The production of glycols and esters thereof by the condensation of aliphatic primary aldehydes with 3 to 6 carbon atoms which comprises heating the aldehyde in the presence of a carbide of an alkaline-earth metal.

2. The production of glycols and esters thereof by the condensation of aliphatic primary aldehydes with 3 to 6 carbon atoms which comprises heating the aldehyde in the presence of a carbide of an alkaline-earth metal and an oxide of an alkaline-earth metal.

3. The production of glycols and esters thereof by the condensation of aliphatic primary aldehydes with 3 to 6 carbon atoms which comprises heating the aldehyde in the presence of a carbide of an alkaline-earth metal and a hydroxide of an alkaline-earth metal.

4. The production of ethyl-hexandiol and its butyric acid ester which consists in refluxing butyric aldehyde with calcium carbide for approximately four hours and to a temperature of from 120° to 140° C., cooling, acidifying and fractionating.

5. The production of a substituted propandiol and its caproic acid ester which consists in heating caproic aldehyde with calcium carbide for approximately four hours and to approximately 110° C., filtering and fractionating the filtrate.

6. The production of substituted pentandiol propionate which consists in refluxing propionic aldehyde with calcium carbide for about six hours, and distilling off the methyl-ethyl-acrolein.

7. The simultaneous production of an hexandiol, its butyrate and a substituted acrolein which consists in refluxing butyric aldehyde with calcium carbide and separating the resulting products.

8. The simultaneous production of a substituted saturated diol, its caproic acid ester and a substituted acrolein which consists in heating caproic aldehyde with calcium carbide and separating the resulting products.

9. The simultaneous production of a substituted saturated diol, its propionate and a substituted acrolein which consists in refluxing propionic aldehyde with calcium carbide and separating the resulting products.

10. The simultaneous production of an hexandiol, its butyrate and ethyl-propyl-acrolein which consists in boiling butyric aldehyde with calcium carbide to between 120 and 140° C., cooling, acidifying the mixture and fractionating.

11. The simultaneous production of a substituted saturated diol, its caproic acid ester and butyl-amyl-acrolein which consists in heating caproic aldehyde with calcium carbide for about four hours and to about 120° C., and fractionating.

12. The simultaneous production of a substituted saturated diol, its propionate and methyl-ethyl-acrolein which consists in refluxing propionic aldehyde with calcium carbide for six hours and distilling off the acrolein compound.

HANS MACHEMER.